United States Patent
Callaghan et al.

[11] Patent Number: 5,630,444
[45] Date of Patent: May 20, 1997

[54] HIGH PRESSURE BELLOWS VALVE

[75] Inventors: David Callaghan, Edinboro; Richard K. Reber, Erie, both of Pa.

[73] Assignee: Snap-Tite, Inc., Union City, Pa.

[21] Appl. No.: 639,267

[22] Filed: Apr. 24, 1996

[51] Int. Cl.$^6$ .................................. F16K 31/00
[52] U.S. Cl. ........................... 137/550; 251/335.3
[58] Field of Search ............... 137/550; 251/335.3, 251/282

[56] References Cited

U.S. PATENT DOCUMENTS

| | | | |
|---|---|---|---|
| 2,880,620 | 4/1959 | Bredtschneider | 74/18.2 |
| 3,097,662 | 7/1963 | Peters | 137/338 |
| 3,528,087 | 9/1970 | Perkins | 137/625.4 |
| 3,826,465 | 7/1974 | Whittaker et al. | 251/335.2 |
| 4,166,607 | 9/1979 | Webb | 251/335.3 |
| 4,240,610 | 12/1980 | Trimble | 251/335.2 |
| 4,487,582 | 12/1984 | Warrin | 137/550 |
| 4,509,721 | 4/1985 | Lassally | 251/335.2 |
| 4,634,009 | 1/1987 | Dunko et al. | 251/335.3 |
| 4,687,017 | 8/1987 | Danko et al. | 137/315 |
| 4,688,601 | 8/1987 | Astill | 137/625.5 |
| 5,178,304 | 1/1993 | Tortertot | 251/335.3 |
| 5,351,936 | 10/1994 | Tanikawa et al. | 251/335.3 |

*Primary Examiner*—A. Michael Chambers
*Attorney, Agent, or Firm*—Woodling, Krost and Rust

[57] ABSTRACT

The invention is a bellows valve which seals the stem of the valve. Dirt and other contaminants are trapped by the bellows. The valve includes a cover having a sintered metal filter therein. The filter permits gas to flow therethrough but does not permit dirt or other particulate contamination to flow therethrough. Pressure is equalized across the walls of the bellows allowing the valve to operate at high pressures while ensuring that the gas or fluid transported through the valve is kept clean.

12 Claims, 3 Drawing Sheets

HIGH PRESSURE BELLOWS VALVE

BACKGROUND OF THE INVENTION

Certain applications require extremely clean fluids, including gases, to be transported from a source to a load. Transportation necessarily involves valves which can introduce dirt into the fluid or gas. The present invention prevents intrusion of dirt into the fluid or gas by sealing the valve stem with a metal bellows. A filter is employed which communicates between the exterior and bore of the cover thus equalizing the differential pressure across the bellows. This enables operation of the valve at extremely high pressures.

In valves not having bellows, the main mechanism for the introduction of dirt into the fluid flowing through the valve is the packing which seals the stem of the valve. Valve packing can be made from many different materials. All packing materials tend to disintegrate and generate small particles which pass along the stem and into the transported fluid. The disintegration of the packing occurs when the valve stem moves against the packing as the valve is opened or closed. The small particles can have a disastrous influence on certain processes such as the manufacture of microcomputer chips.

Various valve stem seals employing bellows are known. U.S. Pat. Nos. 4,687,017 and 4,634,099 to Danko et al., U.S. Pat. No. 4,240,610 to Trimble, U.S. Pat. No. 3,097,662 to Peters, and, U.S. Pat. No. 4,688,601 to Astill disclose metallic bellows type valve stem seals. Other valve stem seals employ fluid filled buffer chambers and bellows to effect seals. U.S. Pat. No. 2,880,620 to Bredtchneider discloses the insertion of an incompressible fluid in a bonnet chamber adjacent bellows. Similarly, U.S. Pat. No. 3,826,465 to Whittaker et al. discloses the insertion of an incompressible fluid into two buffer fluid chambers adjacent bellows.

The present invention satisfies the need for a high pressure bellows having approximately no differential pressure across the interior and exterior of the bellows. Approximately zero pressure differential across the interior and exterior of the bellows is accomplished by the filter in the cover and communicating passageways. The equalization of pressure across the wall of the bellows permits operation of the valve at pressures of 30,000 pounds per square inch gage.

SUMMARY OF THE INVENTION

The present invention is an apparatus for sealing valve stems. Dirt and other contaminants can and do enter fluid streams passing through valves that do not have sealed valve stems. The present invention employs a bellows secured to a valve cover and a stem end which permits movement of the stem end and the stem with respect to the valve cover. The valve stem is sealed by the bellows. A filter resides in the cover and communicates with a bore in the cover and the exterior of the bellows. The bore of the cover in turn communicates with the interior of the bellows.

The bellows are metallic bellows. Communication means between the exterior and the interior of the bellows allow pressure equalization across the wall of the bellows enabling operation of the valve at very high pressure without deformation of the bellows.

The principal source of contaminants is the packing. Friction between the packing and the valve stem causes disintegration of the packing. Particles of disintegrated packing travel in an annular space between the bore of the cover and the valve stem and into the bellows where they cannot escape. The filter in the cover permits communication between the exterior and the interior of the bellows. However, the filter will not permit the dirt or other contamination emanating from the packing to pass through the filter. Thus the contaminants are contained within the bellows and/or within an annular space surrounding the stem of the valve and bounded by the bore of the cover.

It is an object of the present invention to seal a valve stem in a valve operating at high pressure. The fluid in the valve can be either gas or liquid.

It is a further object of the present invention to affix a flexible metallic bellows at one end to a cover and to affix the other end to a stem end. The bellows seal the stem preventing contaminants from travelling along the stem and mixing with the fluid flowing through the valve.

It is an object of the present invention to provide a filter residing in a cover. The filter communicates with a bore in the cover. The bore, in turn, communicates with the interior of a metallic bellows which is affixed to the cover and a stem end. The filter communicates with the exterior of a bellows through an annular passageway located between the cover and the valve body.

It is an object of the present invention to provide a bellows affixed at one end to a cover and at the other end to a stem end. The bellows includes an interior and an exterior. Means are provided for communication between the interior and exterior of the bellows such that pressure is equalized across the wall of the bellows.

It is an object of the present invention to provide a valve capable of operating at high pressure which does not permit any intrusion of contaminants into the flow of fluid through the valve. The valve includes an inlet passageway, an intermediate passageway and an outlet passageway. The valve stem end seats against a valve seat.

The accompanying drawings together with the description and the claims serve to further explain the invention.

BRIEF DESCRIPTION OF THE DRAWINGS

FIG. 1 illustrates the valve in its first, closed, position.

FIG. 2 also illustrates the bellows sealing the stem from the bore through the body of the valve.

A more detailed discussion of the drawings and the invention is given below in the Description of the Preferred Embodiment.

DETAILED DESCRIPTION OF THE PREFERRED EMBODIMENT

Figure 1:
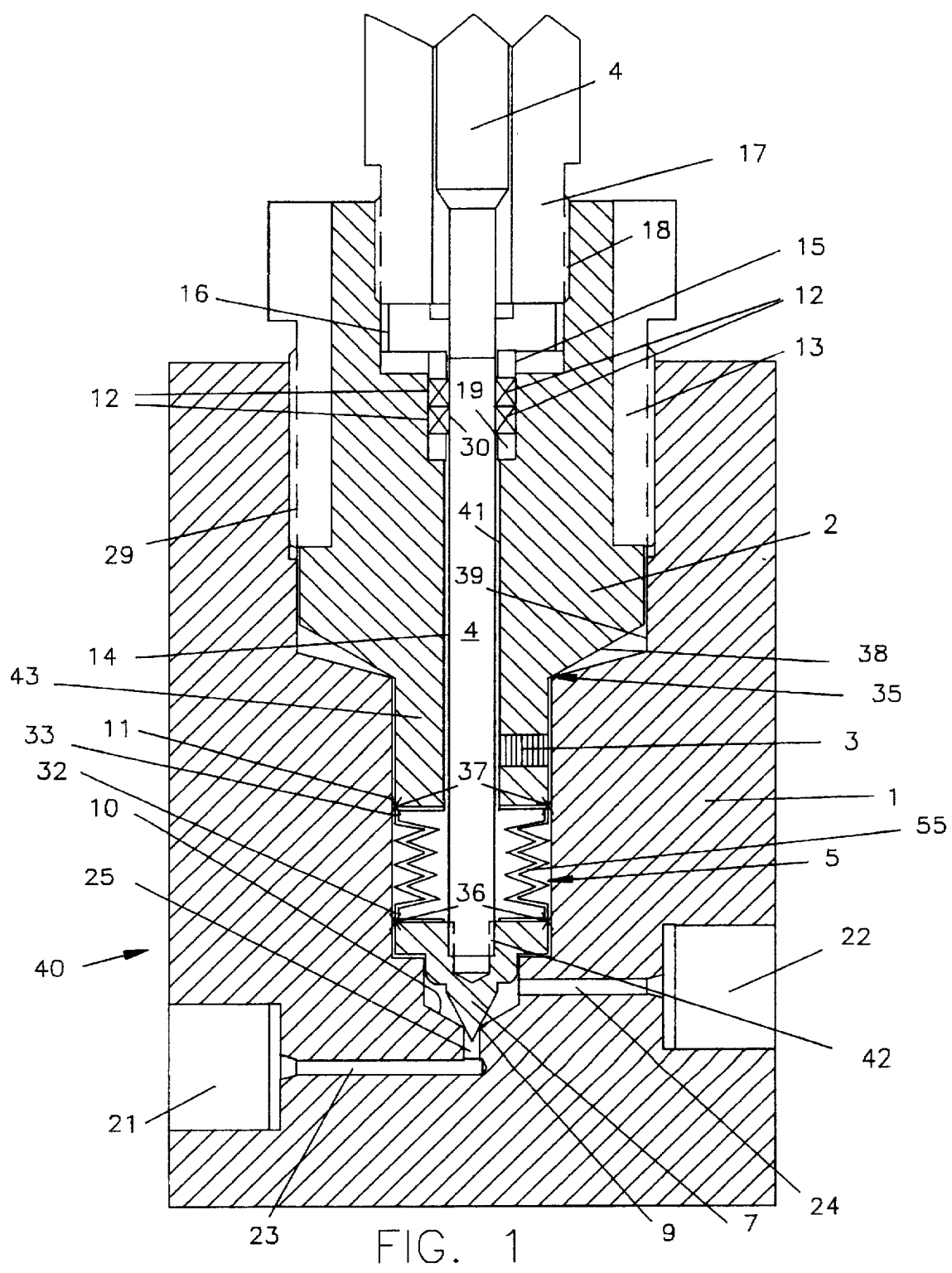
FIG. 1 is a cross sectional view of the valve illustrating the body, cover, filter, stem and stem end with the bellows interposed between the cover and the stem end.

FIG. 1 is a cross sectional view of the valve 40. FIG. 1 also illustrates the valve body 1, the cover 2, the sintered metal filter 3, the stem 4 and the stem end 7. FIG. 1 illustrates the valve in its first, or closed, position. The Stem end 7 mates against the valve seat 10 to close the valve. The valve actuator is not shown.

Figure 2:
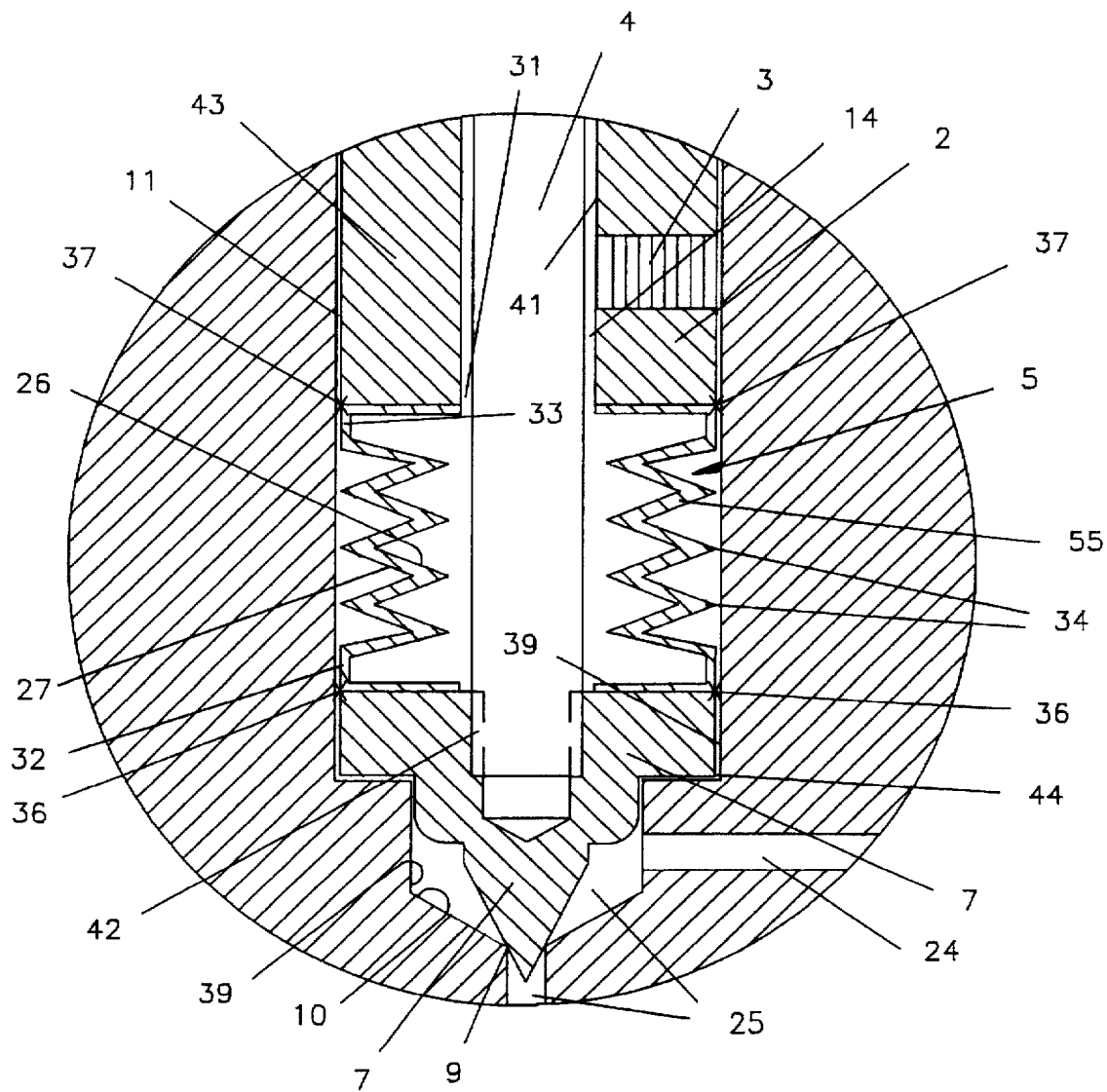
FIG. 2 is an enlarged cross sectional view of the stem end, stem, bellows, filter and communicating passageways whereby pressure is equalized between the interior and the exterior of the bellows.

Sometimes the stem end 7 is referred to herein as the first end portion of the stem 4. Interposed between the stem end 7 and the cover 2 is bellows 5. In the preferred embodiment the bellows 5 is made of metal. As best shown in FIG. 2, the bellows is welded to the cover and reference numeral 37 is used to indicate the welding of the bellows to the cover. Additionally, as shown best in FIG. 2 the reference numeral 36 is used to indicate the welding of the bellows 5 to the stem end 7. The welds, indicated by "X" marks, extend circumferentially and seal the bellows 5 to the cover 2 and the stem end 7.

The bellows 5 includes a first end portion 32 affixed to the stem end. The bellows further includes a second end portion 33 affixed to the cover 2. These are best viewed in FIG. 2.

FIG. 2 is an enlarged view of a portion of FIG. 1 illustrating the cover 2, filter 3, valve body 1, stem 4, stem end 7, and the bellows 5 interposed between the cover and the stem end.

The cover 2 is generally cylindrically shaped and includes a shoulder 38 thereon. The body 1 is a block having a bore 39 therein. The shoulder 38 of cover 2 engages the bore 39 of the body at a point designated by reference numeral 35. The cover 2 is sealed with respect to the body 1 at the point indicated by reference numeral 35. The bore 39 in the body is generally cylindrically shaped as shown by FIG. 1.

The cover is secured in place by means of a lock down, or gland nut 13, as illustrated in FIG. 1. Reference number 29 represents the threaded interconnection between the gland nut 13 and the body 1 which forces the cover to sealingly engage the body 1.

Figure 3:
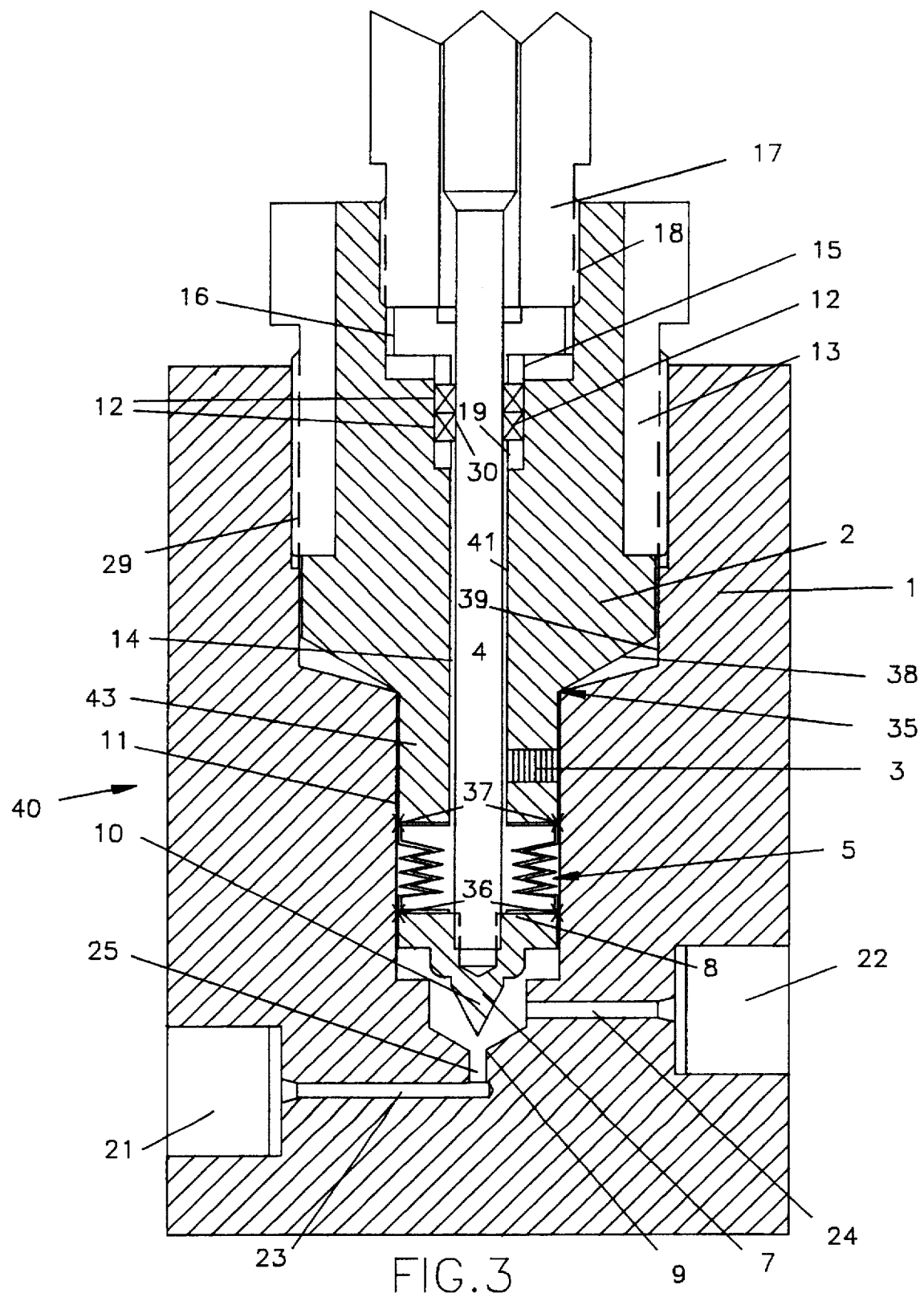
FIG. 3 is a cross sectional view of the valve in its second, open, position.

The cover 2 includes a bore 41 that extends therethrough. The stem 4 is threadably affixed to the stem end 7. Reference numeral 42 represents the threaded interconnection between the stem 4 and the stem end 7. It will be readily recognized by those skilled in the art that the stem end 7 could be integrally manufactured with the stem and be made such that the stem and the stem end are a single piece. The stem 4 as viewed in FIG. 1 is shown having different cross sectional areas. It will be noted that the stem has a larger diameter near where it would be connected to the actuator. The actuator of the valve is not shown in this application. The stem 4 extends through the cover 2 as shown in FIGS. 1 and 3.

Packing 12 seals the stem. In the preferred embodiment the packing is teflon glass. Packing 12 is secured in place by a combination of the first packing washer 15, the second packing washer 16, and the third packing washer 19. The packing washers and packing are forcibly restrained in position by the packing gland 17. The packing gland 17 is threadably interconnected with the cover 2 as indicated by reference numeral 18. Reference numeral 18 is the threaded interconnection between the packing gland 17 and the cover 2. It will be readily recognized by those skilled in the art that as the stem 4 moves with respect to the packing 12, the packing disintegrates over time. The particulate disintegration of the packing is contained within the bellows 5 as will be discussed below. Reference numeral 30 indicates the frictional interface between the packing 12 and the stem 4.

The cover 2 has a first end portion 43. The diameter of the first end portion 43 is smaller than the diameter of the bore 39 at the location of the first end portion 43 of the cover 2. Annular space 11 is created between the body 1 and the cover 2. In a similar fashion the diameter of the stem 4 is smaller than the diameter of the bore 41 through the cover 2. Annular space 14 is created between the stem 4 and the cover 2.

FIG. 2 illustrates the bellows 5 interposed between the cover 2 and the stem end 7. Bellows 5 includes an interior 26 and an exterior 27. FIG. 2 also illustrates a sintered metal filter 3 residing in the cover 2 communicating with the annular space 11 between the cover 2 and the body 1 and the annular space 14 between the stem 4 and the cover 2. The annular space 14 between the stem 4 and the cover 2 communicates with the interior 26 of the bellows through a gap 31 at the entrance to the second end 33 of the bellows 5. See FIG. 2. The sintered metal filter of the preferred embodiment is made from stainless steel and will not permit particles having a size larger than or equal to 0.01 microns to pass therethrough.

It will be readily understood by those skilled in the art that when viewing FIG. 2 that any particulate contamination which may exist along the stem 4 generated by the disintegration of the packing will not be permitted to escape outwardly through the sintered metal filter 3. The particulate from the packing is larger than the pore size of the filter and hence cannot pass through the filter. Instead the particulates will be contained inside the bellows 5. It will also be readily understood by those skilled in the art that the exterior of the bellows will be at the same pressure as the interior of the bellows since a direct path of communication between the exterior of the bellows 27 and the interior of the bellows 26 is provided through the filter. This results in zero differential pressure across the wall 55 of the bellows.

FIG. 3 illustrates the valve in the second, or open, position. As viewed from FIGS. 1 and 3 the valve includes an inlet port 21; an outlet port 22, an inlet passageway 23, an outlet passageway 24, and an intermediate passageway 25 linking the inlet and outlet passageways.

FIG. 3 further illustrates the compression of the bellows 5. Bellows 5 includes fins 34 as shown in FIG. 2. Bellows 5 is readily compressible and extendable between its two operating positions, namely those shown in FIGS. 1 and 3. Bellows 54 of the preferred embodiment is made from stainless steel. However, nonmetallic bellows may be used in other embodiments.

FIG. 2 best illustrates the communication of pressure between the exterior 27 of the bellows and the interior 26 of the bellows. The gas or fluid pressure that is flowing through the valve has a passageway to the interior of the bellows. Namely that passageway is as follows when viewing FIG. 2. The gas or fluid in the passageway 25 passes in the annular space 44 which exists between the stem end 7 and the bore 39 of the body 1 and proceeds along the exterior 27 of the bellows and into the annular space 11 between the cover 2 and the body 1. The gas passes through the sintered metal filter 3 and into the annular space 14 between the stem 4 and the cover 2 and into the interior 26 of the bellows through the gap 31 at the second end 33 of the bellows 5. In this way the pressure is at all times equalized between the interior 26 and the exterior 27 of the bellows 5.

The equalization of pressure across the wall 55 of the bellows enables the bellows to operate at high pressures up to and including 30,000 pounds per square inch gage. Reference numeral 9 as indicated in FIG. 2 indicates the point of tight shutoff between the stem end 7 and the valve seat 10. Even during times of tight shutoff the pressure in and on the interior of the bellows 26 and on the exterior of the bellows 27 will be at the same pressure, to wit, the pressure of the outlet passageway 24 of the valve. Therefore, zero pressure differential across the bellows exists regardless of the valve position.

In the preferred embodiment the body 1 is manufactured of stainless steel and is generally in a shape of a cube or block. It is thick walled to handle working pressures up to and including 30,000 pounds per square inch gage.

The invention has been described in detail with particular emphasis on the preferred embodiments thereof, but it should be understood that variations and modifications within the spirit and scope of the invention may occur to those skilled in the art to which the invention pertains.

What is claimed is:

1. A valve comprising a body; said body includes a passageway therethrough; a stem; a stem end; said stem end affixed to said stem and moveable therewith; a cover affixed to said body; a bellows; said bellows includes an interior and an exterior; said bellows affixed and sealed to said stem end and said cover; said cover includes a filter; said stem end moveable between first, closed, and second, open, positions; said stem end engaging said body and prohibiting fluid flow through said passageway of said body when said stem end is in said first, closed position; said stem end permitting fluid flow through said passageway of said body when said stem end is in said second, open position; a packing; said packing sealingly engaging said cover and said stem; said filter permits pressurization of said interior of said bellows such that the pressure on said interior and exterior of said bellows is substantially equal when said stem end is in said second, open position; and, said filter prohibiting entry of contaminants into said passageway of said body.

2. A valve as claimed in claim 1 wherein said filter is sintered metal filter element.

3. A valve as claimed in claim 2 wherein said sintered metal filter element prohibits the passage of contaminants larger than 0.01 microns.

4. A valve as claimed in claim 1 wherein said bellows is welded to said cover and said stem end.

5. A valve as claimed in claim 1 wherein said bellows is made of metal and said filter is a sintered metal filter element.

6. A valve comprising: a body; said body includes a passageway therethrough; a cover affixed to said body; said cover includes a bore therethrough; a stem; said stem extending through said bore of said cover; a stem end affixed to said stem and moveable therewith between first, closed, and second, open positions; a bellows having an interior and an exterior; said bellows residing intermediate said stem end and said cover and being affixed to said cover and said stem end; said cover includes a filter; said filter being in communication with said passageway of said body and said bore of said cover such that the pressure in said interior and said exterior of said bellows is substantially equal when said stem end is in said second, open, position.

7. A valve as claimed in claim 6 wherein said bellows is flexibly compressible and extendable; said bellows further includes a first end portion and a second end portion; said first end portion being affixed to said stem end and said second end portion affixed to said cover; said first end portion of said bellows moveable with said stem end and said stem and compressible with respect to said second end portion of said bellows and said cover when said stem end is in said second, open position; and, said first end portion of said bellows moveable with said stem end and said stem and extendable with respect to said second end portion and said cover when said stem end is in said first, closed position.

8. A valve as claimed in claim 7 wherein said bellows is a metallic bellows.

9. A valve as claimed in claim 8 wherein said filter is a sintered metal filter.

10. A valve as claimed in claim 8 further including fluid pressure up to 30,000 pounds per square inch gage in said passageway of said body.

11. A valve comprising: a passageway; a stem; said stem includes a stem end; a cover; said cover includes a stem bore; a bellows; said bellows having an interior and an exterior; said bellows residing between and affixed to said cover and said stem end; said stem end being moveable to open and close said passageway of said valve; said cover includes a filter; said filter prohibiting entry of contaminants into said passageway of said valve; said filter communicates with said interior and exterior of said bellows such that pressure in said interior of said bellows is substantially equal to pressure on said exterior of said bellows when said passageway is open.

12. An apparatus sealing a valve stem for comprising: a stem; said stem includes a first end portion; a bellows; said bellows include an interior and an exterior, a first end portion and a second end portion; a cover; said cover includes a filter, a bore therethrough, and an exterior; said stem extending through said bore of said cover and being moveable with respect to said bore; said first end portion of said bellows being sealingly affixed to said first end portion of said stem and moveable therewith and said second end portion of said bellows being sealingly affixed to said cover; said filter communicates between the exterior and bore of said cover; and, said bore of said cover communicates with said interior of said bellows such that there is zero differential pressure across said interior and exterior of said bellows.

* * * * *

UNITED STATES PATENT AND TRADEMARK OFFICE
CERTIFICATE OF CORRECTION

PATENT NO : 5,630,444
DATED : May 20, 1997
INVENTOR(S): David Callaghan, et al.

It is certified that error appears in the above-identified patent and that said Letters Patent is hereby corrected as shown below:

On the title page, item [57],
Line 6, delete "wails" and insert --walls--.

Signed and Sealed this

Fifth Day of August, 1997

Attest:

BRUCE LEHMAN

Attesting Officer

Commissioner of Patents and Trademarks